United States Patent Office 3,557,122
Patented Jan. 19, 1971

3,557,122
5,6,7a,8,11,11a,12,12a-OCTAHYDROINDOLO
[2,1-a]ISOQUINOLIN-9(10H)-ONES
John Shavel, Jr., Mendham, and Glenn C. Morrison,
Dover, N.J., assignors to Warner-Lambert Pharmaceutical Company, Morris Plains, N.J., a corporation of Delaware
No Drawing. Filed Oct. 10, 1968, Ser. No. 766,636
Int. Cl. C07d 39/00
U.S. Cl. 260—289　　　　　　　　　　3 Claims

ABSTRACT OF THE DISCLOSURE

This invention relates to new and novel 5,6,7a,8,11,11a,12,12a - octahydroindolo[2,1 - a]isoquinolin-9(10H)-ones having the formula:

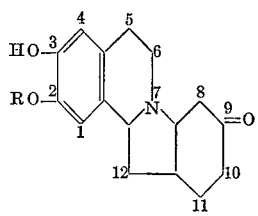

wherein R is hydrogen and lower alkyl of 1 to 6 carbon atoms, such as methyl, ethyl, or isobutyl and so on.

The compounds of this invention are useful as hypotensive agents.

---

This invention relates to new and useful heterocyclic compounds, more particularly to new and novel 5,6,7a,8,11,11a,12,12a - octahydroindolo[2,1 - a]isoquinolin - 9 (10H)-ones of the formula:

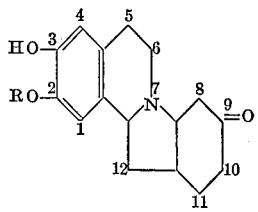

wherein R is hydrogen and lower alkyl of 1 to 6 carbon atoms, such as methyl, ethyl or isobutyl and so on.

This invention also includes within its scope a new and novel process for preparing the above compounds, as well as the intermediates employed for their synthesis.

The symbol R as used hereinafter has the same meaning as described above.

The intermediates employed for the synthesis of the above compounds are also valuable in the production of other compounds of the 5,6,7a,8,11,11a,12,12a-octahydroindolo[2,1-a]isoquinolin-9(10H)-one seires.

The compounds of this invention are prepared by reacting p-methoxyphenylacetic acid of the formula:

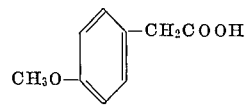

(I)

with an amine of the formula:

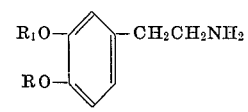

(II)

wherein $R_1$ is methyl or hydrogen; to give an amide of the formula:

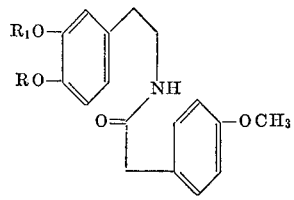

(III)

wherein $R_1$ is also methyl or hydrogen.

The above reaction is carried out by heating the acid and amine at an elevated temperature at about 190°. The benzyl derivative of compound III may be prepared by treating with benzyl bromide in the presence of sodium hydroxide. Upon treatment of the amide with a cyclodehydration agent, such as phosphorus oxychloride or phosphorous pentoxide, there is formed a dihydroisoquinoline of the formula:

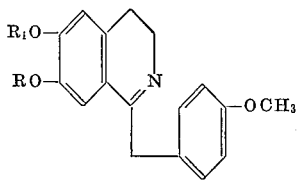

(IV)

wherein $R_1$ is $CH_3$ or

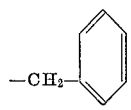

reduction of the dihydroisoquinoline, compound IV, with an alkali metal borohydride such as sodium borohydride affords a tetrahydroisoquinoline of the formula:

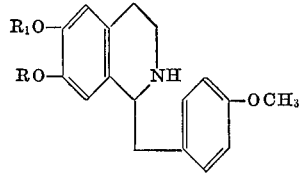

(V)

wherein $R_1$ is —$CH_3$ or

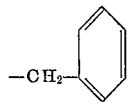

In the above structure, when $R_1$ is

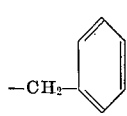

compound V can be converted to the corresponding phenol by reduction with hydrogen in the presence of a noble metal catalyst such as palladium.

Treatment of the above compound V, when $R_1$ is methyl or hydrogen, with an alkali metal such as sodium and an aliphatic alcohol such as tert-butanol in liquid ammonia gives a compound of the formula:

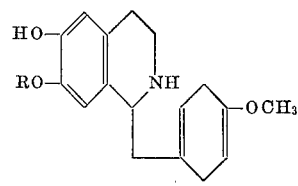

(VI)

Hydrolysis of compound VI with mineral acid such as hydrochloric acid gives the α,β-unsaturated ketone of the formula:

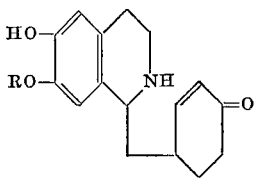

(VIII)

Prolonged heating of compound VI or VII with a mineral acid, such as hydrochloric acid, in a lower molecular weight alcohol, such as isopropanol, afforded the 5,6,7a,8,11,11a,12,12a - octahydroindolo[2,1-a]isoquinolin-9(10H)-ones of this invention.

The compounds of this invention are useful as hypotensive agents in mammals, such as dogs, cats, monkeys and the like. In order to produce the desired hypotensive effects, they are administered either intravenously or orally, preferably intravenously, at a dose of about 1 to 10 mg./kg. These compounds are indicated in hypertensive states and a dosage regimen of about 1 to 10 mg./kg. body weight is administered to obtain the desired hypotensive effects. In order to use these compounds as hypotensive agents, they are combined with an inert pharmaceutical carrier, such as water for injection, peanut oil and the like to form dosage forms suitable for parenteral administration. They may also be combined with other inert pharmaceutical carriers, such as lactose, mannitol, and compounded into dosage forms such as tablets, capsules and the like.

The above-described dosage regimen may be varied according to body weight and severity of the condition being treated by methods well known to the healing arts.

The compounds of our invention may be converted into their pharmaceutically acceptable non-toxic acid addition and quarternary ammonium salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques. The quarternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate, or methyl p-toluene sulfonate. The N-oxides are prepared by treating the corresponding free base with hydrogen peroxide.

The following examples are included in order further to illustrate the invention.

EXAMPLE 1

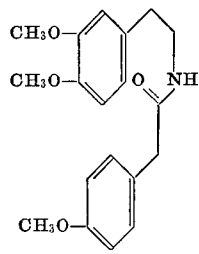

N-(3,4-dimethoxyphenethyl)-2-(p-methoxyphenyl) acetamide

A mixture of 54.4 g. of 3,4-dimethoxyphenethylamine and 50.0 g. of p-methoxyphenylacetic acid was heated at 190° for 2 hrs. The reduction mixture was poured into 250 ml. of benzene. On standing there was deposited 87.0 g. of a crystalline solid, M.P. 123–124°. Further recrystallization gave an analytical sample, M.P. 124–124.5°.

Analysis.—Calcd. for $C_{19}H_{23}NO_4$ (percent): C, 69.28; H, 7.04; N, 4.25. Found (percent): C, 69.58; H, 7.06; N, 4.43.

EXAMPLE 2

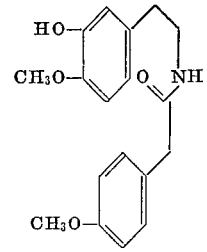

N-(3-hydroxy-4-methoxyphenethyl)-2-(p-methoxyphenyl)acetamide

A mixture of 105 g. of 3-hydroxy-4-methoxyphenethylamine and 106 g. of 4-methoxyphenylacetic acid was heated at 190° for 1½ hrs. Recrystallization of the residue from methanol-ether gave 131 g. (67%) of a solid, M.P. 112–118°. Further recrystallization gave an analytical sample, M.P. 116.5–117°.

Analysis.—Calcd. for $C_{18}H_{21}NO_4$ (percent): C, 68.55; H, 6.71; N, 4.44. Found (percent): C, 68.74; H, 6.71; N, 4.67.

EXAMPLE 3

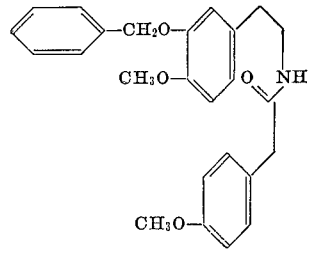

N-(3-benzyloxy-4-methoxy)-2-(p-methoxyphenyl)acetamide

A solution of 45 g. of N-(3-hydroxy-4-methoxyphenethyl)-2-(p-methoxyphenyl)acetamide, 12 g. of sodium hyroxide, and 41 g. of benzyl bromide in 500 ml. of methanol was refluxed for 2 hrs. Then a solution of 6.0 g. of sodium hydroxide in 10 ml. of water was added and refluxing was continued for an additional 3 hrs. The reaction mixture was poured into 2.5 l. of water and was extracted with methylene chloride. The methylene chloride layer was washed with water, dried over sodium sulfate, and the solvent was removed. Crystallization of the residue from a mixture of 100 ml. of ethyl acetate and 160 ml. of isopropyl ether gave 36.8 g. (64%), M.P. 114.5–118°. Recrystallization from isopropyl ether gave an analytical sample, M.P. 114.5–117.5°.

Analysis.—Calcd. for $C_{25}H_{27}NO_4$ (percent): C, 74.05; H, 6.71; N, 3.45. Found (percent): C, 74.32; H, 6.76; N, 3.66.

EXAMPLE 4

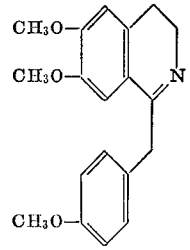

3,4-dihydro-6,7-dimethoxy-1-(p-methoxybenzyl) isoquinoline hydrochloride

A solution of 80 g. of N-(3,4-dimethoxyphenethyl)-2-(p-methoxyphenyl)acetamide and 70 ml. of phosphorus oxychloride in 600 ml. of benzene was refluxed for 90 min. Filtration of the reaction mixture gave a solid which on recrystallization from ethanol gave 84 g. (99%) of a solid, M.P. 193.5–194.5°. Recrystallization from n-butanol gave an analytical sample, M.P. 195–196°.

*Analysis.*—Calcd. for $C_{19}H_{22}ClNO_3$ (percent): C, 65.61; H, 6.37; N, 4.03; Cl, 10.19. Found (percent): C, 65.77; H, 6.31; N, 3.80; Cl, 10.22.

EXAMPLE 5

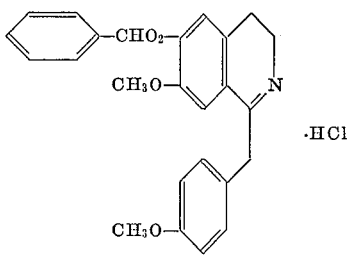

6-benzyloxy-3,4-dihydro-7-methoxy-1-(p-methoxybenzyl) isoquinoline hydrochloride 1/2 hydrate A solution of 65 g. of N-(3-benzyloxy-4-methoxy)-2-(p-methoxyphenyl)acetamide and 70 ml. of phosphorous oxychloride in 500 ml. of benzene was refluxed for 2 hrs. The reaction mixture was poured into 3 l. of ether. The precipitate was taken up in 300 ml. of hot ethanol and 900 ml. of water was added. On standing there was deposited 59.4 g. (87%) of a crystalline solid, M.P. 171–173°. Recrystallization from ethanol gave an analytical sample, M.P. 170–170.5°.

*Analysis.*—Calcd. for $C_{25}H_{27}ClNO_{3.5}$ (percent): C, 69.36; H, 6.29; O, 12.93; Cl, 8.19. Found (percent): C, 69.65; H, 6.40; O, 12.89; Cl, 8.17.

EXAMPLE 6

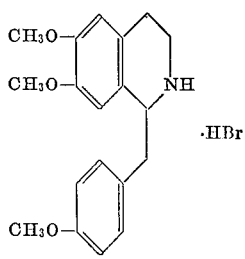

1,2,3,4-tetrahydro-6,7-dimethoxy-1-(p-methoxybenzyl) isoquinoline hydrobromide

To a solution of 80 g. of 3,4-dihydro-6,7-dimethoxy-1-(p-methoxybenzyl)isoquinoline hydrochloride in 350 ml. of ethanol and 1500 ml. of water was added 15 g. of sodium borohydride while the temperature was held at 20–30°. After the addition had been completed stirring was continued for an additional 15 min. The pH was adjusted to 11 with 40% sodium hydroxide solution and the mixture was extracted with ether. The ether layer was washed with water, dried over sodium sulfate, and the solvent was removed. The residue was dissolved in ether and excess hydrogen bromide added. Titration of the precipitate was continued with isopropanol and gave 45 g. (50%) of a solid, M.P. 212–213°. Recrystallization from ethanol gave an analytical sample, M.P. 213–213.5°.

*Analysis.*—Calcd. for $C_{19}H_{24}BrNO_3$ (percent): C, 57.88; H, 6.13; N, 3.55; Br, 20.27. Found (percent): C, 57.68; H, 6.21; N, 3.46; Br, 20.33.

EXAMPLE 7

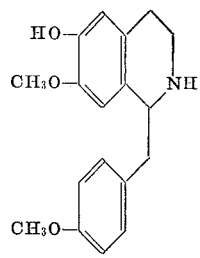

1,2,3,4-tetrahydro-7-methoxy-1-(p-methoxybenzyl)-6-isoquinolinol hydrochloride

To a solution of 5.0 g. of 6-benzyloxy-1,2,3,4-tetrahydro-7-methoxy-1-(p-methoxybenzyl) - 2-methylisoquinoline and 20 ml. of 2 N hydrochloric acid in 125 ml. of ethanol was added to 1.5 g. of 5% palladium on carbon and the mixture was hydrogenated. The catalyst was removed by filtration and the solution was concentrated to 75 ml. On standing there was deposited 3.3 g. (75%) of a crystalline solid, M.P. 238–238.5°. Recrystallization from ethanol gave an analytical sample, M.P. 238.5–239°.

*Analysis.*—Calc'd for $C_{18}H_{21}NO_3 \cdot HCl$ (percent): C, 64.38; H, 6.60; N, 4.17; Cl, 10.56. Found (percent): C, 64.45; H, 6.63; N, 4.34; Cl, 10.61.

The free base was obtained on shaking the salt with methylene chloride and sodium bicarbonate solution and removing the solvent from the organic layer as a crystalline solid, M.P. 176–177°. Recrystallization from ethanol gave an analytical sample, M.P. 177.5–178°.

*Analysis.*— Calc'd for $C_{18}H_{21}NO_3$ (percent): C, 72.21; H, 7.07; N, 4.68. Found (percent): C, 72.12; H, 6.90; N, 4.85.

EXAMPLE 8

6-benzyloxy-1,2,3,4-tetrahydro-7-methoxy-1-(p-methoxybenzyl)-isoquinoline

To a solution of 59.4 g. of 6-benzyloxy-3,4-dihydro-7-methoxy-1-(p-methoxybenzyl)isoquinoline hydrochloride ¾ hydrate in 1 l. of ethanol was added 10 g. of sodium borohydride and the solution was stirred for 2 hrs. The reaction mixture was diluted with 1 l. of water, made basic with 40% sodium hydroxide solution and was extracted with methylene chloride. The methylene chloride layer was washed with water, dried over sodium sulfate, and the solvent was removed. Crystallization of the residue from 400 ml. of isopropyl ether gave 29 g. (59%) of a solid, M.P. 89–90°. Further recrystallization gave an analytical sample, M.P. 89.5–90°.

*Analysis.*—Calc'd for $C_{25}H_{27}NO_3$ (percent): C, 77.09; H, 6.99; N, 3.60. Found (percent): C, 77.11; H, 6.99; N, 3.87.

EXAMPLE 9

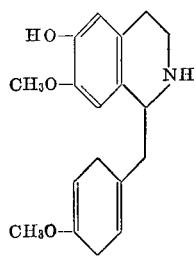

1-[(4-methoxy-1,4-cyclohexadien-1-yl)methyl]-1,2,3,4-tetrahydro-7-methoxy-6-isoquinolinol(9)

Method A—To a solution of 10.2 g. of 1,2,3,4-tetrahydro-7-methoxy-1-(p - methoxybenzyl)-6-isoquinolinol in 400 ml. of tetrahydrofuran was added 800 ml. of ammonia. Over a 2 hr. interval 8.2 g. of sodium and 20 ml. of t-butanol were added alternately in six equal portions. The ammonia was allowed to evaporate, the residue was poured into 1.2 l. of water, and the pH of the solution was adjusted to 8. On standing, there was deposited a solid, which after recrystallization from benzene afforded 7.3 g. (71%) of a solid, M.P. 167–168.5°.

Method B—To a solution of 14.3 g. of 1,2,3,4-tetrahydro-6,7-dimethoxy - 1-(p-methoxybenzyl)isoquinoline in 200 ml. of tetrahydrofuran was added 400 ml. of ammonia. Over a 1.5 hr. interval 5.5 g. of sodium and 23 ml. of t-butanol were added in ten equal portions. The ammonia was allowed to evaporate and the residue was poured into 1.2 l. of water. The pH was adjusted to 8, and the solution was extracted with methylene chloride. The methylene chloride layer was washed with water, dried over sodium sulfate and the solvent was removed. Crystallization of the residue from isopropyl ether gave 2.9 g. (20%) of a solid, M.P. 146–161°. Recrystallization from benzene gave an analytical sample, M.P. 168.5–170°. This sample was shown to be identical to the sample from method A by the method of mixture melting point and infrared analysis.

*Analysis.*—Calc'd for $C_{18}H_{23}NO_3$ (percent): C, 71.73; H, 7.69; N, 4.65. Found (percent): C, 71.46; H, 7.67; N, 4.52.

EXAMPLE 10

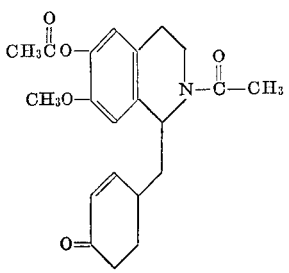

4-[(6-acetoxy-2-acetyl-1,2,3,4-tetrahydro-7-methoxy-1-isoquinolyl)methyl]-2-cyclohexen-1-one A solution of 0.50 g. of 1-[(4-methoxy-1,4-cyclohexadien - 1 - yl)methyl] - 1,2,3,4-tetrahydro-7-methoxy-6-isoquinolinol and 15 ml. of hydrochloric acid was refluxed for 1 hr. The methanol was removed in vacuo and 100 ml. of water was added to the residue. The pH was adjusted to 9 with 10% sodium hydroxide solution and the solution was extracted with methylene chloride. The methylene chloride layer was dried over sodium sulfate and the solvent was removed. A solution of the residue (0.46 g.) and 10 ml. of acetic anhydride in 10 ml. of pyridine was allowed to stand at room temperature for 20 hrs. Removal of the volatiles in vacuo afforded 0.30 g. (49%) of a crystalline solid, M.P. 228–231°. Recrystallization from benzene gave an analytical sample, M.P. 241–242.5°.

*Analysis.*—Calcd. for $C_{21}H_{25}NO_5$(percent): C, 67.90; H, 6.78; N, 3.77; O, 21.54. Found (percent): C, 68.18; H, 6.91; N, 3.83; O, 21.39.

EXAMPLE 11

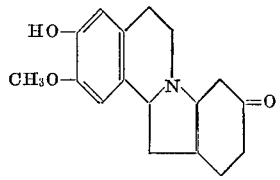

cis-anti-5,6,7a,8,11,11a,12,12a-octahydro-3-hydroxy-2-methoxyindole[2,1-a]isoquinolin-9(10H)-one A solution of 1.0 g. of 1-[(4-methoxy-1,4-cyclohexadien - 1 - yl)methyl] - 1,2,3,4-tetrahydro-7-methoxy-6-isoquinolinol, and 50 ml. of hydrochloric acid in 50 ml. is isopropanol was refluxed for 48 hrs. The reaction mixture was poured into 200 ml. of water. The pH of the resulting solution was adjusted to 8 with 40% sodium hydroxide solution and the solution was extracted with chloroform. The chloroform layer was dried over sodium sulfate and the solvent was removed. Crystallization of the residue from ethyl acetate-Skellysolve B gave 0.32 g. (34%) of a solid, M.P. 154–155.5°. Recrystallization from isopropyl ether gave an analytical sample, M.P. 157–158.5°.

*Analysis.*—Calcd. for $C_{17}H_{21}NO_3$ (percent): C, 71.05; H, 7.37; N, 4.87. Found (percent): C, 71.28; H, 7.63; N, 5.04.

It is understood that the foregoing detailed description is given merely by way of illustration and that many variations may be made therein without departing from the spirit of our invention.

Having described our invention, what we desire to secure by Letters Patent is:

1. A compound of the formula:

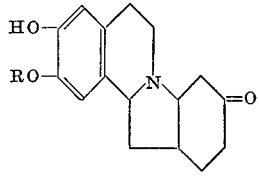

wherein R is hydrogen or lower alkyl, its pharmaceutically acceptable acid addition salts and its N-oxides.

2. A compound according to claim 1 wherein R is methyl.

3. A process for the production of a compound according to claim 1, which comprises treating a compound of the formula:

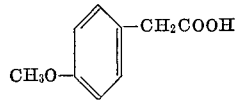

(1)

with an amine of the formula:

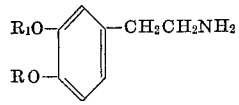

(2)

at a temperature of about 190° C. to obtain an amide of the formula:

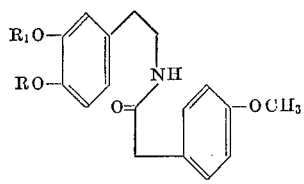

(3)

treating said amide with a cyclodehydration agent selected from phosphorous oxychloride or phosphorous pentoxide to form a dihydroisoquinoline of the formula:

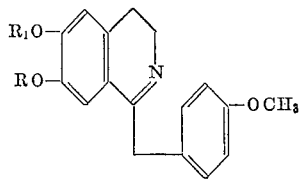

(4)

treating said dihydroisoquinoline 4 with an alkali metal borohydride to yield a tetrahydroisoquinoline of the formula:

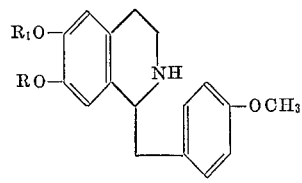

(5)

treating said compound 5 with an alkali metal in a lower molecular weight alcohol in liquid ammonia to obtain a compound of the formula:

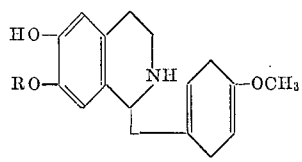

(6)

and heating compound 6 with a strong nonoxidizing mineral acid.

References Cited

UNITED STATES PATENTS 3,336,316  8/1967  Brown et al. _____ 260—286
3,498,988  3/1970  Houlihan et al. _____ 260—289

DONALD G. DAUS, Primary Examiner

U.S. Cl. X.R.

260—286, 287, 521, 559, 570.8, 690; 424—258